United States Patent
Palanisamy et al.

(10) Patent No.: US 7,585,594 B2
(45) Date of Patent: Sep. 8, 2009

(54) ELECTROLYTE WITH INDICATOR

(75) Inventors: Thirumalai G. Palanisamy, Morristown, NJ (US); Alfred Siggel, Hanover (DE); Stephen E. LaCroix, Morristown, NJ (US); Michael Fooken, Seelze (DE); Thomas Potrawa, Seelze (DE); Jacques Geenen, Madison, NJ (US)

(73) Assignee: Honeywell International Inc., Morristown, NJ (US)

( * ) Notice: Subject to any disclaimer, the term of this patent is extended or adjusted under 35 U.S.C. 154(b) by 904 days.

(21) Appl. No.: 10/955,544

(22) Filed: Sep. 30, 2004

(65) Prior Publication Data

US 2005/0069761 A1 Mar. 31, 2005

Related U.S. Application Data

(60) Provisional application No. 60/507,291, filed on Sep. 30, 2003.

(51) Int. Cl.
*H01M 6/16* (2006.01)
*H01M 6/04* (2006.01)
*H01M 4/00* (2006.01)
*H01M 2/26* (2006.01)

(52) U.S. Cl. ............... 429/330; 429/121; 429/221; 429/188; 429/324

(58) Field of Classification Search ......... 429/121, 429/221, 330, 194, 218, 198; 252/301.2 R
See application file for complete search history.

(56) References Cited

U.S. PATENT DOCUMENTS

| | | | | |
|---|---|---|---|---|
| 3,900,418 A | * | 8/1975 | Bard et al. | 252/62.2 |
| 4,888,255 A | * | 12/1989 | Yoshimitsu et al. | 429/101 |
| 4,999,265 A | * | 3/1991 | Dopp | 429/347 |
| 5,662,736 A | * | 9/1997 | Sakai et al. | 106/31.29 |
| 5,677,083 A | * | 10/1997 | Tomiyama | 429/231.3 |
| 5,965,054 A | | 10/1999 | Mcewen et al. | |
| 6,010,806 A | * | 1/2000 | Yokoyama et al. | 429/330 |
| 6,120,696 A | | 9/2000 | Armand et al. | |
| 6,132,636 A | | 10/2000 | Singh et al. | 252/68 |
| 6,178,034 B1 | | 1/2001 | Allemand et al. | |
| 6,327,070 B1 | | 12/2001 | Heuer et al. | |
| 2003/0124423 A1 | * | 7/2003 | Sasaki et al. | 429/221 |

FOREIGN PATENT DOCUMENTS

WO WO 2004/062007 7/2004

OTHER PUBLICATIONS

Visual, WordNet Search, <http://wordnet.princeton.edu> Aug. 6, 2008.*
Anthraquinone, Wikipedia, <http://en.wikipedia.org/wiki/Anthraquinone> Aug. 6, 2008.*

(Continued)

*Primary Examiner*—Dah-Wei D Yuan
*Assistant Examiner*—Zachary Best
(74) *Attorney, Agent, or Firm*—Carrie Beatus

(57) ABSTRACT

An electrolyte with an indicator, such as a dye, for detecting leakage from an electrochemical energy storage device is provided. Also provided is a method of making such an electrolyte with indicator; a device that incorporates such an electrolyte with indicator; a method of manufacturing an electronic or electrical system that incorporates such a device; and a method of detecting the leakage of electrolyte from a battery or capacitor.

25 Claims, 2 Drawing Sheets

OTHER PUBLICATIONS

Dihydrocoumarin 119-84-6. Jan. 16, 2009 <http://www.thegoodscentscompany.com/data/rw1001531.html>.*
Arbizzani et al., Adv. Mater. 8: 331, (1996).
Ren et al. in Electrochemical Capacitors, F.M. Delnick and M. Tomkiewicy, Editors, PV95-29, p. 15, The Electrochemical Society Proceedings Services, Pennington, N.J. (1996).

* cited by examiner

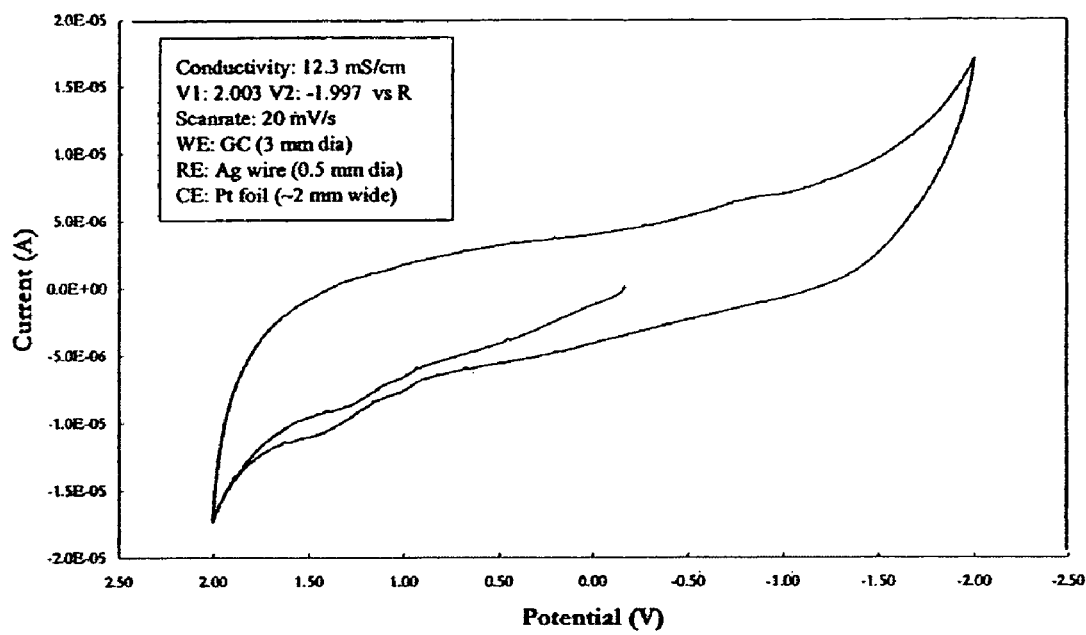
Fig.1 Cyclic Voltammetry
1.0 Molar TEABF$_4$ in PC Without Dye
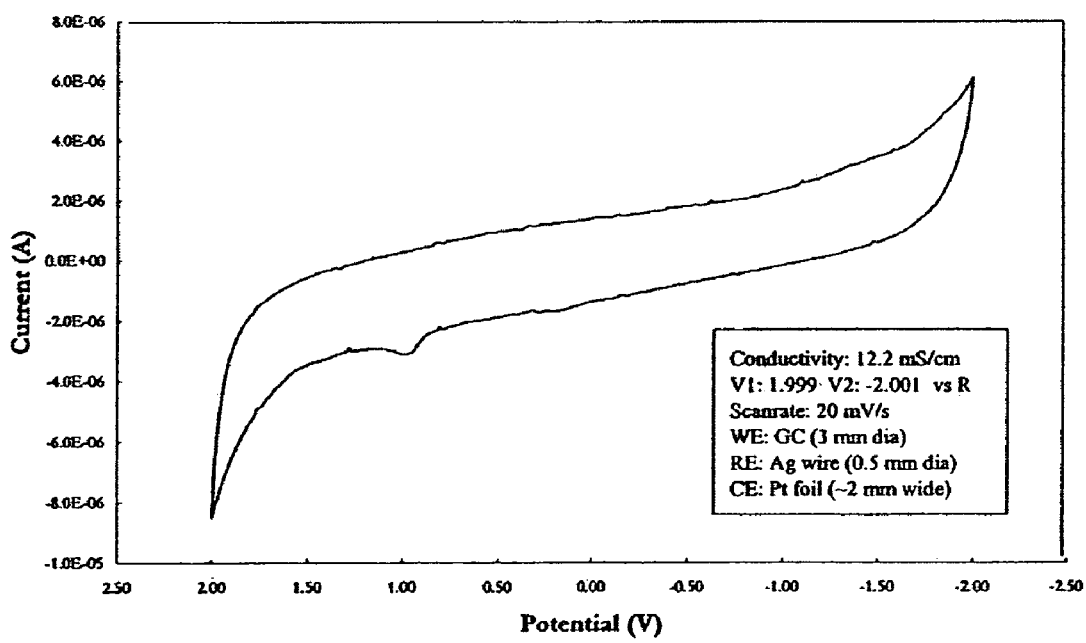
Fig. 2 Cyclic Voltammetry
1.0 Molar TEABF$_4$ in PC with 1 PPM Dye

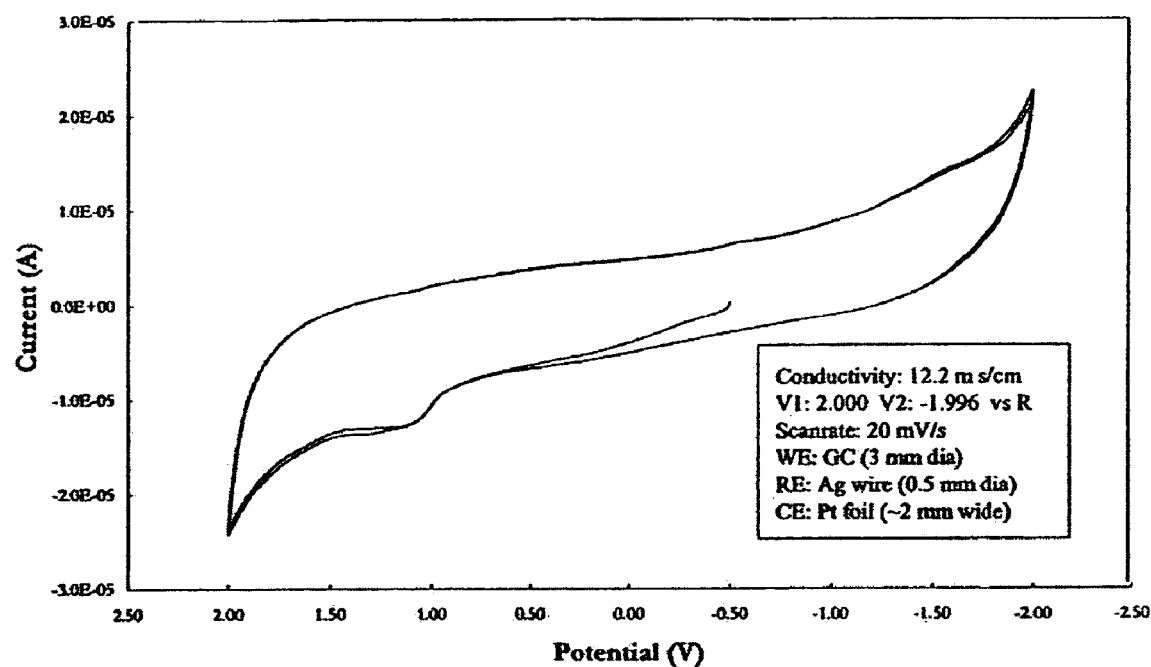

ELECTROLYTE WITH INDICATOR

REFERENCE TO RELATED APPLICATIONS

This application claims priority benefit to U.S. Provisional Application No. 60/507,291 filed on Sep. 30, 2003, which is incorporated herein by reference.

FIELD OF INVENTION

The present invention relates generally to electrolytes useful in electrical energy storage devices, and, more specifically, to non-aqueous electrolytes.

BACKGROUND OF INVENTION

Significant effort has been invested over the years in improving the capacity and power of electrical energy storage devices such as capacitors and batteries. Of particular interest herein are supercapacitors. These energy storage devices are particularly useful in short term, high power applications such as electric vehicles and wireless communication devices. A typical supercapacitor comprises carbon-based electrodes and a liquid electrolyte having charged ions which can be ordered around the electrodes to create a potential between the electrodes.

A liquid electrolyte typically comprises an ionic salt dissolved in a solvent. A wide variety of solvents and salts are available for such use, offering specific advantages depending on the application being considered (e.g., low temperature vs. high temperature). Generally, non-aqueous electrolytes are preferred from the standpoint of electrochemical stability and are considered herein in detail. A common nonaqueous electrolyte comprises a salt, e.g., tetraethyl ammonium tetrafluoroborate (TEABF4) or methyltriethyl ammonium tetrafluoroborate (MTEABF4), dissolved in an organic solvent, e.g., acetonitrile (AN), propylene carbonate (PC) or gamma butyrolactone (GBL). More recently, applicants have discovered that pyridinium tetrafluoroborate salt (PyHBF4) can be dissolved in certain known solvents, such as, propylene carbonate (PC), acetonitrile (AN), and gamma butyrolactone (GBL), to yield an electrolyte having an unexpectedly high conductivity and unexpectedly wide window of electrochemical stability.

Obviously, to be effective, the electrolyte must be contained within the electrochemical storage device. These devices sometimes leak electrolyte, however, due to an improper seal in assembly or damage after manufacture. Generally this leak is small and not noticeable. However, when the device is installed in the electronic/electrical systems, the electrolyte can cause corrosion of the components of the system, thereby ruining the system in which the device is placed. Therefore, there is a need to determine the existence of electrolyte leakage in the device before its installation in an electrical system.

SUMMARY OF INVENTION

The present invention provides an approach for determining electrolyte leakage in an electrochemical device early in the manufacturing process before the components are installed in electronic circuits and systems. Specifically, the present invention involves mixing an indicator, such as a dye, with the electrolyte. The indicator may be detectable under ordinary conditions, such as when exposed to the visible light spectrum, or, its detectability may be enhanced under certain conditions, such as when exposed to non-visible electromagnetic frequencies, for example, UV light. This latter embodiment may be preferable since often the device manufacturers only want the indicator to be detectable under special (non ambient) conditions.

One aspect of the invention is an electrolyte composition comprising an indicator. In a preferred embodiment, the electrolyte comprises a salt, a solvent and an indicator in an amount effective to render the electrolyte detectable under certain conditions.

Another aspect of the invention is a method of preparing the electrolyte composition of the present invention. In a preferred embodiment, the method comprises: (a) providing an electrolyte comprising a salt and a solvent; and (b) adding an effective amount of an indicator to the electrolyte such that the electrolyte is detectable and distinctive under certain conditions.

BRIEF DESCRIPTION OF DRAWINGS

FIG. 1 shows the voltage window for a TEABF4/PC electrolyte with no dye.
FIG. 2 shows the voltage window for a TEABF4/PC electrolyte with 1 ppm 1,8-naphthalimide dye.
FIG. 3 shows the voltage window for a TEABF4/PC electrolyte with 10 ppm 1,8-naphthalimide dye.

DETAILED DESCRIPTION

The present invention provides for an electrolyte comprising a salt, a solvent, and an indicator in an amount effective to render the electrolyte detectable under certain circumstances.

The term "indicator", as used herein, refers to a substance which is detectably distinctive under certain conditions, such as under UV light. To facilitate understanding of this invention, the indicator is described herein with particular reference to systems utilizing tetraethyl ammonium tetrafluoroborate (TEABF4) dissolved in propylene carbonate (PC) as an electrolyte, although it should be understood that the invention is not limited to these systems and can be practiced with any traditional electrolyte system or new systems such as those described in international publication no. WO 2004/062007, published Jul. 22, 2004 (international application no. PCT/US2003/041210, filed Dec. 19, 2003), which is hereby incorporated by reference.

The solvent must be capable of dissociating the salt such that its cation and anion can migrate within the solvent to their respective electrodes that are located within the energy storage device. The electrolyte solvent in the present invention may be any traditional solvent, either aqueous or non-aqueous. Preferably, the solvent is an organic solvent. Preferred solvents include, for example, a linear ether, cyclic ether, ester, carbonate, formate, lactone, nitrile, amide, sulfone or sulfolane, and, more preferably, an alkyl carbonate, alkyl nitrile or alkyl lactone. In a particularly preferred embodiment, the solvent is propylene carbonate (PC), acetonitrile (AN), or gamma butyrolactone (GBL). Although AN may provide better electrolyte properties in some instances as compared to PC and GBL, its use as an electrolyte is prohibited in may counties because it can emit dangerous hydrogen cyanide gas.

The electrolyte salt may be any traditional salt or mixtures of such salts that can be used in electrolyte applications, including both aqueous or nonaqueous systems. Preferably, the salt is suitable for non-aqueous electrochemical applications. Preferred salts include, for example, those which combine perfluoro anions such as PF6-, BF4-, AsF6-, and triflate, and cations such as tetraalkyl ammonium or pyridinium. Preferably, the salt is either tetraethyl ammonium tetrafluoroborate (TEABF4), methyltriethyl ammonium tetrafluoroborate (MTEABF4), or pyridinium tetrafluoroborate (PyHBF4).

The concentration of the salt in the solvent can be tailored to the application's particular needs. The preferred concentration, with respect to performance, is one at which the conductivity and the electrochemical stability are maximized. To evaluate an electrolyte's electrochemical stability, the electrolyte is subjected to cyclic voltammetry to determine its "voltage window." As used herein, the term "voltage window" refers to the voltage range which the electrolyte can tolerate without substantially reacting (i.e., undergoing reduction or oxidation). To determine the voltage window, an electrolyte is placed in a cell having a working electrode, a counter electrode, and a test electrode, which is immediately adjacent but not touching the working electrode. The electrodes in the cell are connected to a cyclic voltammetry apparatus, called a potentiostat, which is configured to adjust the current between the working and counter electrodes to maintain a "desired voltage" between the working electrode and the reference electrode. The voltage between the reference electrode and the working electrode can be varied as a function of time in a programmed manner (for example, suitable results have been obtained using a linear change rate of 20 mV/s). The voltage window is determined by progressively increasing the desired voltage (in both the positive and negative directions) until there is a precipitous increase in the current required to drive the working and counter electrodes to maintain the desired voltage. The sharp rise in current at the end voltages generally indicates the breakdown voltage of the electrolyte, meaning that the salt or the solvent is undergoing a reduction reaction at the negative end voltage or an oxidation reaction at the positive end voltage. Such reactions could include gas evolution or simple oxidation/reduction reactions. The voltage difference between these two end voltages at which the current reaches a predetermined value, for example 100 mA/cm2, is called the electrochemical window or "voltage window."

Although the voltage window tends to be relatively constant for a wide range of salt concentrations, the conductivity is typically maxiniized at the highest concentration of salt. Therefore, relatively high concentrations of salts, for example, near the saturation point, are generally preferred from a performance standpoint. However, other considerations, such as the cost of the salt, should also be considered in arriving at the most preferred concentration. In systems utilizing a TEABF4/PC electrolyte, suitable results have been obtained with a concentration of salt from about 0.5 to about 1.0 mol/l.

The indicator may be any substance which has detectable and distinctive characteristics under certain conditions and which does not significantly degrade the electrochemical characteristics of the electrolyte. With respect to this latter property, preferred indicators are those which do not diminish the voltage window or the conductivity of the electrolyte by more than 20%, more preferably, by no more than 10%, and, even more preferably, by no more than 5% compared to the electrolyte without the indicator.

Suitable indicators may be detectable visually, olfactory, or by instrumentation. For example, the indicator may be a dye which is visibly detectable when exposed to visible light or to non-visible electromagnetic radiation (such as IR or UV radiation). Such an indicator may reflect such exposure radiation or emit radiation of a frequency different than the frequency of the exposure radiation (i.e. via fluorescence). As a further example, the indicator may be an odiferous substance which emits a characteristic odor, such as an aromatic or pungent smell, that is detectable by the human nose, animal nose, or instrumentation. Preferably, the indicator is a dye that is visibly detectable when exposed to visible light, UV, and/or IR radiation.

Any dye that is compatible with the provided electrolyte and is detectible at a concentration of less than 25 ppm (based on weight), and preferably at a concentration of less than 10 ppm (based on weight) may be used. As used herein, compatible dyes are those which are stable and soluble in the provided electrolyte while maintaining good fluorescence. Examples of dyes that may be utilized with this invention include naphthalimide-based dyes, such as DayGlo® Tigris Yellow (D-043), DayGlo® Mohawk Yellow (D-299), Lumogen® R Violet 570, and Lumogen® F Blue 650, and especially 1,8-naphthalimide-based dyes such as Spectronics® dye TP-38600-002 commercially available from Spectronics Corp. of New York; perylene-based dyes, such as DayGlo® Apache Yellow (D-208), Lumogen® F Yellow 083, and Lumogen® F Orange 240; coumarin-based dyes, such as DayGlo® Savannah Yellow (D-820), DayGlo® Pocono Yellow (D-098), DayGlo® Scioto Red (D-196), DayGlo® Volga Red (D-197), DayGlo® Ice Blue (D-211), DayGlo® Arkansas Violet (D-330), Coumarin-7® (3-(2-benzothiazolyl)-7 (diethylamino)coumarin) and tris(8-hydroxyquinolinato) aluminum (III) commercially available from Sigma-Aldrich of Germany, Lumilux® CD-314 commerically available from Honeywell International of New Jersey, and Intrawite® MOL commercially available from Crompton & Knowles of the United States; anthraquinone-based dyes, such as polan blue E2R(C.I. 62045), Acid Blue 25 [1-amino-4-(aminophenyl)-2-anthraquinone sodium sulfonate]; and thioxanthene-based dyes, such as DayGlo® Lackawana Yellow (D-191), DayGlo® Ozark Orange (D-063), and DayGlo® Mariold Orange (D-315); as well as dyes based upon organic complexes of rare earth ions and upon organic heterocyclics. DayGlo products are commercially available from DayGlo Color Corp. of Cleveland, Ohio. Lumogen products are commerically available from BASF of Germany.

The chemical properties of most dyes are well documented and one skilled in the art could readily determine compatibility between a particular dye and a particular electrolyte without undue experimentation. For example, for applications utilizing the electrolyte TEABF$_4$/PC, preferred dyes include naphthalimide-based dyes that incorporate any nitrogen alkyl derivatives and any functionalized ring chemistry, both carbocyclic and heterocyclic, with either nitrogen, sulfur, carbon or oxygen. For example, a highly preferred dye is Spectronics dye TP-38600-002 in which the primary component is 1,8-naphthalimide.

The concentration of the indicator in the electrolyte depends upon several factors including, for example, the type of indicator used, the desired level of detectability, and the tolerance of the electrolyte's electrochemical properties to the introduction of the indicator. One skilled in the art will be able to optimize the level of indicator in the electrolyte composition in light of this disclosure. In a preferred embodiment in which 1,8-naphthalimide is used as the indicator in a TEABF4/PC electrolyte, it has been found that dye concentrations of 10 to 50 ppm by weight of the electrolyte provide an electrolyte composition with good electrochemical performance and a high level of detectability.

Another aspect of the present invention is a device incorporating the electrolyte composition described above, such as batteries and capacitors, including single cell and multi-cell capacitor devices, and other non-aqueous electrochemical capacitors, such as the Type III redox polymer system (Ren et al. in Electrochemical Capacitors, F. M. Delnick and M.

Tomkiewicy, Editors, PV95-29, p.15, The Electrochemical Society Proceedings Services, Pennington, N.J. (1996); Arbizzani et al., Adv. Mater. 8: 331, 1996).

Another aspect of the present invention is a method of preparing the electrolyte composition described above. In a preferred embodiment, this method comprises the steps of preparing an electrolyte solution and adding to that solution an effective amount of an indicator to provide the desired detectability of the electrolyte. The order in which the electrolyte components and/or indicator are mixed may be changed. Alternatively, an electrolyte composition after being prepared may be introduced into an electrochemical energy storage device followed by the addition of an indicator into the device.

Yet another aspect of the present invention is the detection of electrolyte leaks in the electrochemical energy storage devices. The detection of leaks at several stages can be instrumental to the effective and safe use of the electrochemical energy storage devices. That is, an electrochemical energy storage device may be inspected under certain conditions to detect electrolyte leaks after manufacture of the device, but before the device is assembled into a larger system. The larger system may be, for example, an electrical power circuit of an electric automobile or a circuit board of an electrical device such as a portable computer or television. Still other applications will be obvious to one of skill in the art in light of this disclosure.

Once installed, the device may be periodically inspected to ensure that the electrolyte is safely contained and is not damaging the system in which it is incorporated. Inspection may be initiated by simply providing the certain conditions under which the indicator is detectable. For example, if the indicator emits visible light upon exposure to certain frequencies of electromagnetic radiation (such as UV radiation), then the inspection would be provided by directing a source of UV radiation at the device. By inspecting the electrochemical energy storage device prior to and after installation into a larger system, electrolyte leakage can be detected early, before the electrolyte damages the larger system in which the electrochemical energy storage device is installed. Furthermore, by providing detectability after installation into a larger system, the electrolyte system of the present invention can forewarn of a potentially dangerous situation before a failure of the system occurs.

EXAMPLES

The following non-limiting examples are used to show the practice of the present invention.

Examples 1a-1b

Examples 1a-1b compare the conductivity of electrolytes with an indicator to an electrolyte without an indicator.

First, approximately 500 ml of a one molar electrolyte solution was prepared by dissolving ½ mole (108.5 grams) of tetraethyl ammonium tetrafluoroborate (TEABF4) salt with enough propylene carbonate (PC) solvent to yield a total volume of 500 ml of electrolyte. This electrolyte solution without an indicator was used as benchmark to compare electrolyte solutions with indicators.

Second, an electrolyte with 10 ppm dye indicator was prepared by (1) dissolving 56.2 milligrams of TP-38600-002 in approximately 50 ml of PC in a 500 ml volumetric flask, (2) transferring 108.6 grams of TEABF4 salt into the volumetric flask; (3) adding sufficient PC to the flask to dissolve the salt completely, and (4) adjusting the volume of the solution to 500 ml by adding additional PC. This one molar TEABF4/PC electrolyte with 10 ppm dye indicator was tested as Example 1a. Other electrolyte solutions were similarly prepared at 1 ppm dye indicator (Example 1b) and 300 ppm dye indicator.

The conductivity of Examples 1a-b and Comparative Example was measured with YSI 3200 meter. Then, the current-voltage characteristics of these solutions were determined by cyclic voltammetry technique using a Princeton Applied Research Potentiostat Model 260 and associated software. The resulting conductivity data is shown in Table 1.

TABLE 1

| | Conductivity Data | |
|---|---|---|
| Example | Concentration of Dye (ppm) | Conductivity (mS/cm) |
| Comparative | 0 | 12.3 |
| 1a | 10 | 12.2 |
| 1b | 1 | 12.2 |

From Table 1 it is clear that the dye at concentrations below 10 ppm has no significant impact on the conductivity of the electrolyte.

The cyclic voltammetry data are shown in FIG. 1-3 for pure TEABF4/PC electrolyte (0 ppm) and the electrolyte containing 1 ppm and 10 ppm of dye using a silver reference electrode, a glassy carbon working electrode, and a platinum counter electrode. There is no significant effect of the dye on the cyclic voltammogram other than the effect of minute amount of oxygen in the anodic direction at around 1 V. Any amide or imide based dye is expected to function as well as the imide based dye used in FIGS. 2 and 3. The depression on the lower section of the curve in FIG. 1 is an oxygen effect that is normally seen in pure electrolytes.

Ultraviolet light screening studies of electrolyte solutions of TEABF4/PC at 1.0 mol/l with 300 PPM addition of Spectronics Dye TP-38600-0002 were performed. The solutions were tested using an UV lamp UVP Model UVGL-25. This instrument has a short-wave ultraviolet light with wavelengths in the range of 200 to 280 nm and a long-wave ultraviolet light with wavelengths in the range of 320 to 400 nm. UV light of both wavelength ranges was used in the test. The following arbitrary color estimation scale was used to judge the effect of the dye on the electrolyte both when wet and dry: 0 (no color)—1 (Very low level color)—2 (low level color)—3 (Medium color)—4 (Medium to High color)—5 (High color).

The electrolyte solution of TEABF4/PC at 1.0 mol/liter containing dye concentrations of 1 ppm, 10 ppm and 300 ppm levels were made. Each concentration was applied to a paper towel separately and allowed to dry for approximately four hours inside a glove box. The towel was then removed and examined.

Visual observation of the paper towel after the solvent evaporation displayed varying intensities of a green fluorescent coloration. The 300 ppm solution showed a level 5 coloration in both wet and dry conditions. The 10 ppm solution showed a level 4 when wet and 1 when dry. The 1 ppm solution showed level 0 coloration when dry and level 1 coloration while wet.

These same samples were then tested for luminescent under short-wave and long-wave ultraviolet light. Under short-wave UV light, the indicator was visible in both the 300 ppm solution (level 5 coloration) and the 10 ppm solution (level 3 coloration). However, the indicator in the 1 ppm solution had no fluorescent illumination under the short-wave UV radiation (level 0 coloration). Exposure of these samples to long-wave (black light) UV light produced similar results.

This study has shown that a concentration of 10 ppm Spectronics Dye TP-38600-0002 in the electrolyte solution is preferred for an indicator electrolyte to be used in capacitors. However, the optimum concentration of indicator in the electrolyte will ultimately depend on the individual dye characteristics and the particular application for which the electrolyte is utilized. The following are prophetic examples.

Example 2

A TEABF4/PC electrolyte solution containing a trace (millimolar) amount of fluorescent organic europium chelate as an indicator is prepared. The solution with indicator is tested for cyclic voltammetry and conductivity. This solution produces results similar to those of a TEABF4/PC electrolyte solution having no indicator. Therefore, fluorescent organic europium chelate represents another class of indicators (organic complexes of rare earth ions) that can be used with an the electrolyte.

Example 3

A TEABF4/PC electrolyte solution containing a trace (millimolar) amount of an aniline based fluorescent heterocyclic organic acid as an indicator is prepared. The solution with indicator is tested for cyclic voltammetry and conductivity. This solution produces results similar to those of a TEABF4/PC electrolyte solution having no indicator. Therefore, aniline based fluorescent heterocyclic organic acids represent another class of indicators (heterocyclic organic acids) that can be used with the electrolyte. Furthermore, these indicators can be used in other capacitor and battery electrolytes such as acetonitrile based electrolytes.

Examples 4-24

A TEABF4/PC electrolyte solution containing approximately 10 ppm of the dye indicated in Table 2 is prepared. The solution with the dye is tested for cyclic voltammetry and conductivity. This solution produces results similar to those of a TEABF4/PC electrolyte solution without the dye. Therefore, the indicated dye can be used with the electrolyte.

TABLE 2

| Ex. | Dye |
| --- | --- |
| 4 | DayGlo ® Tigris Yellow (D-043) |
| 5 | DayGlo ® Mohawk Yellow (D-299) |
| 6 | Lumogen ® R Violet 570 |
| 7 | Lumogen ® F Blue 650 |
| 8 | DayGlo ® Apache Yellow (D-208) |
| 9 | Lumogen ® F Yellow 083 |
| 10 | Lumogen ® F Orange 240 |
| 11 | DayGlo ® Savannah Yellow (D-820) |
| 12 | DayGlo ® Pocono Yellow (D-098 |
| 13 | DayGlo ® Scioto Red (D-196) |
| 14 | DayGlo ® Volga Red (D-197) |
| 15 | DayGlo ® Ice Blue (D-211) |
| 16 | DayGlo ® Arkansas Violet (D-330) |
| 17 | Coumarin-7 ® |
| 18 | Tris(8-hydroxyquinolinato)aluminum (III) |
| 19 | Lumilux ® CD-314 |
| 20 | Intrawite ® MOL |
| 21 | polan blue E2R (C.I. 62045) |
| 22 | Acid Blue 25 |
| 23 | DayGlo ® Lackawana Yellow (D-191) |
| 24 | DayGlo ® Ozark Orange (D-063) |
| 25 | DayGlo ® Mariold Orange (D-315) |

What is claimed is:

1. An electrolyte comprising a salt, a solvent, and at least one 1,8-Naphthalimide dye.

2. The electrolyte of claim 1, wherein said dye is present in an amount effective to render the electrolyte visually detectable when said electrolyte is exposed to electromagnetic radiation in the visible light spectrum.

3. The electrolyte of claim 1, wherein said dye is present in an amount effective to render the electrolyte visually detectable when said electrolyte is exposed to electromagnetic radiation at a frequency below the frequencies occurring in the visible light spectrum.

4. The electrolyte of claim 3, wherein said electromagnetic radiation frequency is in the infrared range.

5. The electrolyte of claim 1, wherein said dye is present in an amount effective to render the electrolyte visually detectable when said electrolyte is exposed to electromagnetic radiation at a frequency above the visible light spectrum.

6. The electrolyte of claim 5, wherein said electromagnetic radiation frequency is in the ultraviolet range.

7. The electrolyte of claim 1, wherein the concentration of the dye in the electrolyte is about 5 parts per million (ppm) to about 300 ppm by weight of the electrolyte.

8. An electrolyte comprising a salt, a solvent, and at least one dye comprising an organic europium chelate.

9. The electrolyte of claim 1 wherein the concentration of the dye is about 10 to about 50 ppm by weight of the electrolyte.

10. The electrolyte of claim 1, wherein said salt comprises one or more anions selected from the group consisting of perfluoro borates, perfluoro phosphates, perfluoro sulfonates, or organic sulfonates.

11. The electrolyte of claim 1, wherein said salt comprises one or more cations selected from the group consisting of tetraalkyl ammonium or pyridinium.

12. The electrolyte of claim 1, wherein said salt is one or more selected from the group consisting of tetraethyl ammonium tetrafluoroborate, methyltriethylammonium tetrafluoroborate, pyridinium tetrafluoroborate, tetraethyl ammonium hexafluorophosphate, tetraethyl ammonium hexafluoroarsenate, or imidazolium salts.

13. The electrolyte of claim 1, wherein said solvent is one or more selected from the group consisting of linear ether, cyclic ether, ester, carbonate, formate, lactone, nitrile, amide, sulfone, or sulfolane.

14. The electrolyte of claim 13, wherein said solvent is one or more selected from the group consisting of alkyl carbonate, alkyl nitrile, or alkyl lactone.

15. The electrolyte of claim 13, wherein said solvent is one or more selected from the group consisting of acetonitrile, glutaronitrile, sulfolane, gammabutyrolactone, propylene carbonate, ethylene carbonate, or dimethyl carbonate.

16. The electrolyte of claim 1, wherein said salt is tetraethyl ammonium tetrafluoroborate and said solvent is either propylene carbonate or acetonitrile.

17. The electrolyte of claim 1 having a voltage window that is at least about 80% of the voltage window of a reference electrolyte, wherein said reference electrolyte consists of the same salt and solvent in the same molar ratio as the electrolyte of claim 1.

18. The electrolyte of claim 17 having a voltage window that is at least about 90% of the voltage window of said reference electrolyte.

19. The electrolyte of claim 18 having a voltage window that is at least about 95% of the voltage window of said reference electrolyte.

20. The electrolyte of claim 1 having a conductivity that is at least about 80% of the conductivity of a reference electrolyte, wherein said reference electrolyte consists of the same salt and solvent in the same molar ratio as the electrolyte of claim 1.

21. The electrolyte of claim 20 having a conductivity that is at least about 90% of the conductivity of said reference electrolyte.

22. The electrolyte of claim 21 having a conductivity that is at least about 95% of the conductivity of said reference electrolyte.

23. An electrochemical energy storage device comprising:
 a. a housing;
 b. a plurality of electrodes in said housing;
 c. an electrolyte contained in said housing wherein said electrolyte comprises a salt, a solvent, and at least one 1,8-Naphthalimide dye.

24. The device of claim 23 wherein said electrochemical energy storage device is a capacitor.

25. The device of claim 23 wherein said electrochemical energy storage device is a battery.

* * * * *